June 30, 1964  E. RUCHSER  3,139,109
VALVE CONTROL SYSTEM
Filed March 7, 1962  5 Sheets-Sheet 1

INVENTOR
Erich Ruchser

June 30, 1964   E. RUCHSER   3,139,109
VALVE CONTROL SYSTEM

Filed March 7, 1962   5 Sheets-Sheet 3

Fig. 3

INVENTOR
Erich Ruchser

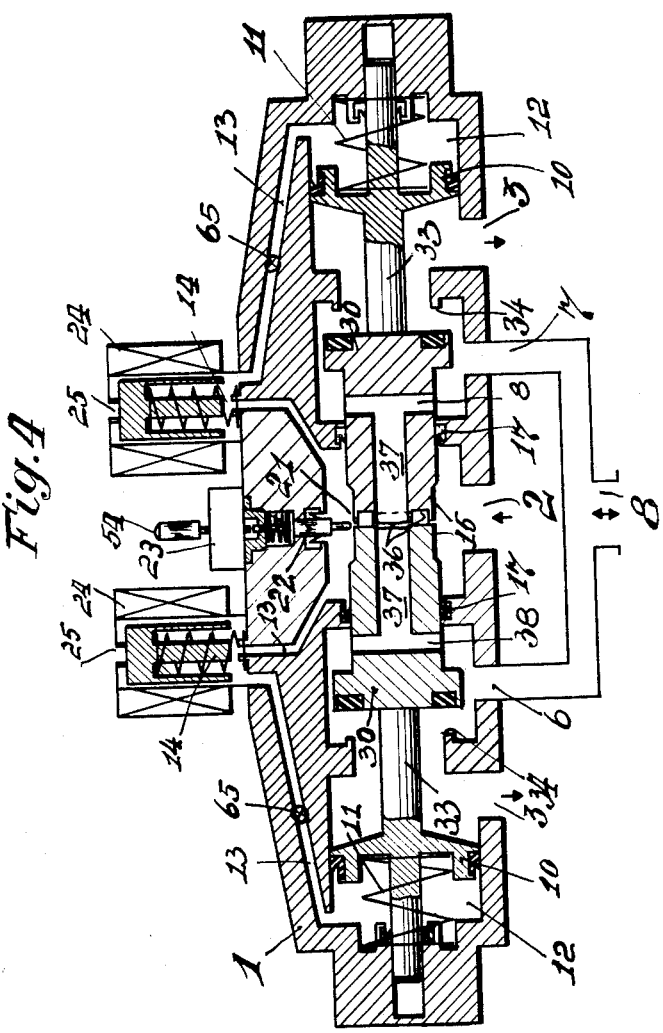

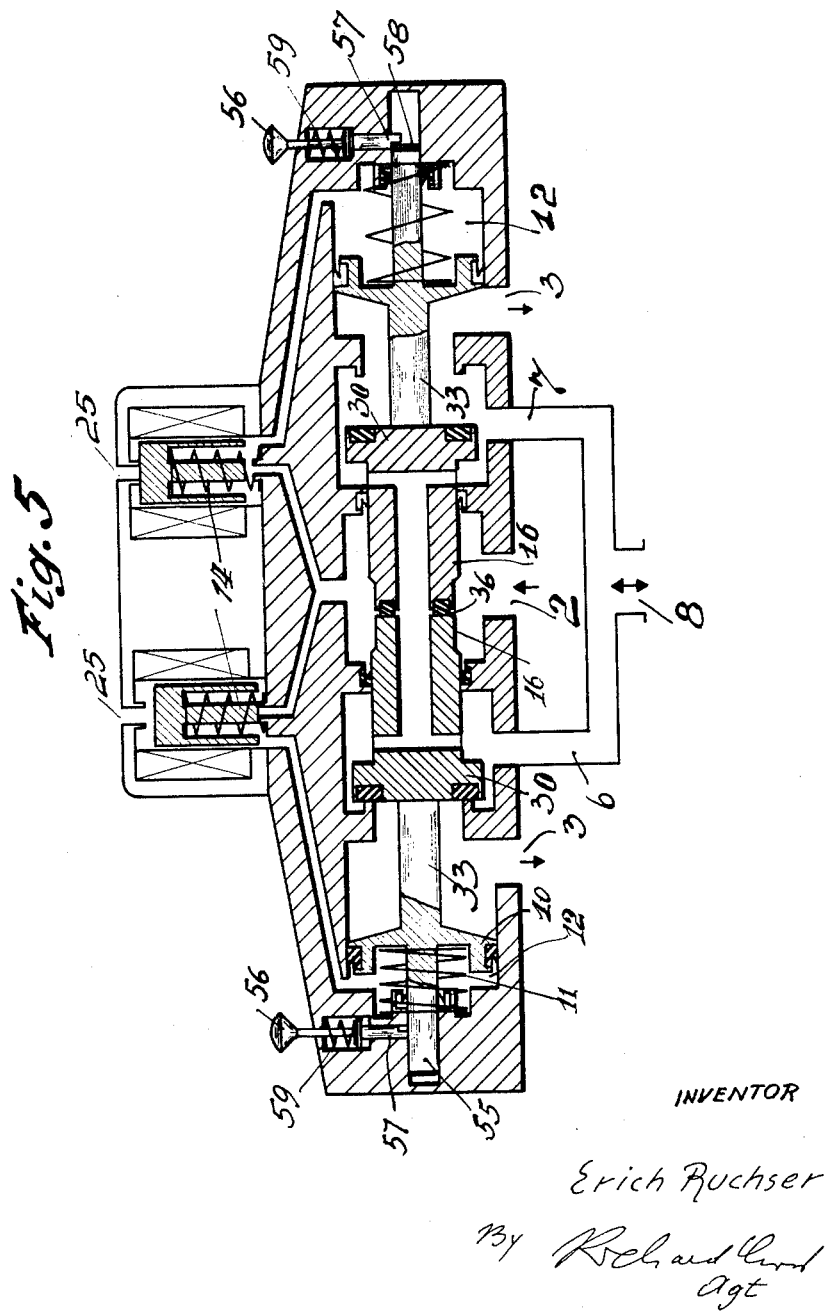

United States Patent Office 3,139,109
Patented June 30, 1964

3,139,109
VALVE CONTROL SYSTEM
Erich Ruchser, Rommelshausen, Germany, assignor to Erich Herion, Stuttgart-Frauenkopf, Germany
Filed Mar. 7, 1962, Ser. No. 178,126
Claims priority, application Germany Mar. 13, 1961
14 Claims. (Cl. 137—596.16)

The invention relates to a valve control system for at least one pressure-operated device, more particularly for the clutch and brake of a control system for a press, and comprises two multiple-way changeover valves which are adapted to be operated simultaneously by auxiliary valves and which comprise in parallel a common pressure medium supply system and two combined pressure medium exit systems for the pressure-operated device, for instance, the clutch or brake of the press. The auxiliary valves can be actuated electromagnetically and control a servo assist circuit allowing a pressure medium to act upon an actuating piston disposed one each on the valve spindles to change over the main control valves.

It is an object of the invention to devise a valve control system of this kind with a safety feature, in order that everything may be rendered inoperative should any of the changeover valves—i.e., the control valves—have a failure in its mechanical part or in its servo part or in the actuation of its auxiliary valve. When a fault occurs in the control system, the pressure-operated device does not remain connected to the pressure medium supply—i.e., such device remains fundamentally isolated from such supply. Any residual pressure in the pressure-operated device can be decreased by way of one of the changeover valves.

Servo control systems comprising safety features are known for pressure-operated devices, the same being protected by hydraulic safety devices in the servo circuit. However, safety systems of this kind become complicated when used for servo control systems having auxiliary valve actuation, preferably of an electro-magnetic kind, since the safety features have to operate indirectly by way of other intermediate elements and pressure medium connections and the motions of these extra elements are not supervised—i.e., not subject to any further safety feature.

It is an object of the invention to simplify the provision of safety features in servo control systems of the kind specified. To this end, according to the invention the ends of the spindles of the two check or multiple-way control valves face one another, bear against one another when in the off position and disengage from one another in normal operation, so that their movement cycles are supervised jointly and continuously by at least one safety element. If one of the control valves fails, the motion of the associated valve spindle alters and such alteration acts as a tripping impulse on the safety element.

The safety element can act directly on the pressure medium supply system through the agency of closure members and/or, by way of further associated closure elements, in the pressure medium exit system of the pressure-operated device, and therefore stop the complete apparatus; alternatively, the safety element acts merely by electromagnetically tripping the auxiliary valves in the sense of a complete stoppage—i.e., depressurisation of the pressure-operated device. According to a further development of the invention, the safety element can act relatively to the valve spindles either directly or indirectly, for instance, by way of interposed springs; and these intermediate devices for storing spring force, in the form of a single spring or of a number of springs, can be adapted to impart an opening movement to the two control valves if the same are in the form of double-entry valves.

It is advisable to provide two control valves, preferably multiple-way slide valves, each with its auxiliary valve and a changeover actuating piston, in the form of three-way slide valves, the slide ends of which merely bear against one another and the slide axes of which are coaxial of one another. These control slide valves are loaded in the closing direction by one spring each in the working chamber of the pilot circuit. Also, the control valves have their connections in parallel with one another. However, the operative travel of the control valves is extended so far to both hands beyond the closing movement and, if required, is also so dimensioned by adjustable stops, that either control valve can travel beyond its normal closure position to follow the opening movement of the adjacent control valve into the end position thereof in the event of faulty operation. This ensures satisfactory operation of the safety element which intervenes in this cycle of movements, yet with the use merely of two standard servo controlled main slide valves. For a normal changeover, all that occurs is that the valve ends disengage from one another at the rhythm of the actuations.

According to a further development of the invention, two standard multiple-way valves servo-controlled by auxiliary valves are used in a parallel arrangement, and the spindle ends of the two multiple-way valves are disposed on a common axis and have their inward ends facing one another. The working chambers of the pistons on the valve spindles for changeover of the main valves by the servo valves form the outer opposite cloasure of the multiple-way valves. However, the supply of pressure medium to the pressure-operated device is by way of the inner valve spindle ends which are in sealing-tight engagement in the casing and some of the interiors of which are hollow, the system being such that the inner spindle ends seal one another, when the working chambers are under pressure, in the sense of a common closure as closure members. Each of the valve spindle ends is so sealed and mounted with its closure members in the casing that each of the valve spindles can follow the movement cycle of the other valve spindle, in the event of a unilateral load on the working chamber, within a desired predetermined distance, with a simultaneous decrease of pressure in the pressure-operated device, if a fault occurs, for instance, at seals or the like.

The cross-sections of the inner valve spindle ends at the seals in the casing are larger than the engaging zones of the inward ends of the valve spindles, to ensure that a difference pressure sufficient to open the two valve spindles away from one another may be provided. Consequently, although standard multiple-way changeover valves, either in the form of seat valves or slide valves, can be used, the inner ends of the valve spindles seal one another permanently after the fashion of a closure member in the normal off position, so that no pressure is produced in the two outlets, combined to form a single connection, to the pressure-operated device and, in the event of incorrect operation of one of the control valves, the faulty valve cannot open the supply which is kept closed by the two spindle ends. The pressure-operated device still remains isolated from the supply pressure and the two valve spindles move into one end position and the two outlets to the load are opened so that any residual pressure therein can be dissipated. The apparatus is therefore stopped and cannot be started until the fault on one side of the system has been cleared or before the normal central position—i.e., the initial position—has been restored by resetting. To restore the central position, the two working chambers of the valves are reconnected to the supply pressure, for instance, by appropriate disconnection of the auxiliary valves. The system then returns to its normal central position—i.e., the two valve spindles return to their normal position—but the valve spindle ends do not disengage from one another during the return movement.

When the two valve spindle ends move in the same direction, a warning or some other safety device can be operated by the ends and can, if required, temporarily or permanently retain the valve spindles in the displaced position until such retention or locking is cancelled manually or by further intervention. Such locking means which operate only as a result of the two valve spindles moving in the same direction, should be provided more particularly when the system according to the invention is used to include possible leakages, for instance, at the closure members or the like, or, for instance, events such as the mechanical sticking of one of the valves, in the supervised category, since even in the event of a temporary pressure rise in the pressure-operated device, depressurisation is ensured immediately the valve spindles have both shifted in the same direction and the inward ends of the valve spindles have engaged with one another.

There may be differences in the timing of the pressure build-up in the working chambers for changing over the two valve spindles, for instance, by means of pressure-operated actuating pistons, and these timing differences may be the result either of different flow conditions in the branched servo auxiliary circuit or of differences in the switching times of the preferably electromagnetic auxiliary valves which are tripped simultaneously. Therefore, one manually controllable throttle zone is provided in each supply duct to the actuating pistons—i.e., after the two servo valves—with a view to equalising the pressure build-up in the two working chambers, thus obviating or at least keeping within desirable limits ocillations and excessive movements of the two valve spindles in either direction in normal operation. This feature provides a way of controlling the sensitivity of the control system according to the invention—i.e., the rate of changeover in either direction when a fault occurs.

According to another feature of the invention, it is advisable for a tripping element, preferably in the form of a piston which is mounted in sealing-tight engagement in the casing so as to be adapted to move axially therein, to be adapted to engage in the recess bounded by the inward ends of the valve spindles, such ends being of smaller diameter than the bearing zone of the valve spindles; in the event of excessive movement of the valve spindles in the same direction, such tripipng element is raised and either operates an electric switch to stop the system electrically or locks closed an extra closure member in the common main supply. The electrical arrangement or the locked closure member in the main supply must be reset manually. The cross-section of the auxiliary displaceable piston engageable in the said recess is so great in relation to a restoring force that, in the event of an excessive pressure rise in the pressure medium supply, the last-mentioned piston can in any event move axially in relation to its tripping means. This provides an extra protection against an excessive pressure rise. The restoring force for this axially displaceable piston is preferably adjustable in order that this extra safety trip may be adjusted to operate at different pressures.

For a better understanding of the invention and to show how the same may be carried into effect, reference may now be made to the accompanying drawings wherein:

FIGURE 3 is a longitudinal section through another embodiment in the normal position, the main valves being multiple-way double-entry valves;

FIGURE 4 is a longitudinal section through another control system comprising two three-way valves formed as double-entry valves and disposed in a normal "off" central position, and FIGURE 5 illustrates the embodiment shown in FIGURE 4 but in the event of incorrect operation, an external safety element latching in the valve spindles.

Figure 1:
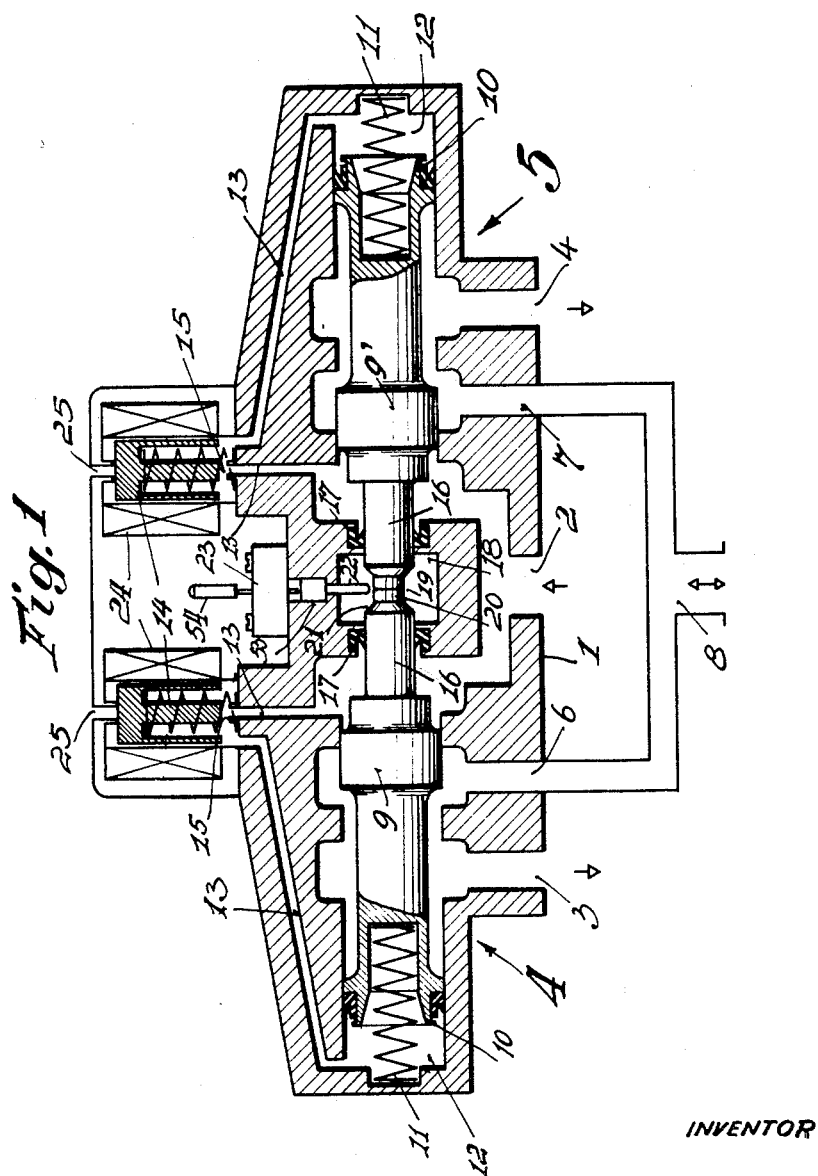
FIGURE 1 is a longitudinal section through a servo control system in which auxiliary valves adapted to be operated simultaneously and electromagnetically are in the normal off position and in which two three-way slide valves are used.

A valve casing 1 comprises a pressure medium supply passage 2 and a pressure medium return passage 3 for two main control valves 4, 5 formed as three-way slide valves. Each valve has its respective pressure medium connection 6, 7 which are combined to form a common line 8 to a pressure-operated device (not shown). Actuating valves 9, 9' of the two valves 4, 5 have actuating pistons 10 at their ends in manner known per se and are so loaded through the agency of adjustable springs 11 as, in the case of the embodiment illustrated in FIGURE 1, to move into the closed position in the pressureless state. Actuating chambers 12 associated with each piston 10 are connected to the supply passage 2 by way of a servo auxiliary circuit 13, and each of the auxiliary valves 14 associated with the main valves 4, 5 keeps a valve seat 15 normally open so that the servo circuit 13 allows pressure medium to reach the pistons 10. The actuating valves 9, 9' have at their ends valve spindles 16 which extend outwards through the wall of the casing 1 in gaskets 17. The spindles 16 can also extend out of the casing 1 into a chamber 18 in the sense of a pressure decrease, without packings. The spindle ends engage with one another by way of thier end faces 19. The spindles 16 are of such an axial length, and have such a corresponding axial movement cycle, that in the event of either of the actuating valves 9, 9' moving in one direction the other spindle 16 can follow the spindle affected over most of its travel. Further particulars about operation will be given hereinafter.

Disposed on the two ends of the spindles 16 are abutments, for instance, in the form of shoulders 20, which bound a common recess 21 when the end faces 19 are in engagement with one another. The spindle ends, instead of bounding a recess 21, can comprise projections which, when the end faces 19 engage with one another, co-operate to form a unitary cam of desired width. The recess 21 (or the alternatively cam (not shown)) engages with a safety or tripping element 22 which, in the embodiment illustrated in FIGURE 1, engages in the recess 21 under the control of an end stop 53. In the embodiment illustrated, the trip element 22 operates an electric switch 23 which, in a manner which is not shown, controls the circuit of two magnets 24 adapted to operate the auxiliary valves 14. Alternatively, the trip element 22, instead of operating such a switch 23, can operate a closure member (not shown) in the main servo supply passage 2 and thus trip such supply completely. In addition or as an alternative, the trip element 22 can so operate another closure member in the pipe 6 so as to connect the same to the exit 3, in order to reduce the pressure in the pressure-operated device.

In the embodiment illustrated, the pressure medium in the supply 2 is operative on the two actuating valves 9, 9' and, by way of the open auxiliary valves 14, upon the actuating pistons 10 which are of larger cross-section than the actuating valves 9, 9'; consequently, each actuating valve 9, 9' initially remains in the closed position, the spindle ends engaging with one another via the end faces 19. When a changeover is made, the pressure operative upon the two pistons 10 decreases and the supply pressure operative on the actuating valves 9, 9' displaces the same and simultaneously compresses the springs 11. The two outlets 3 are now in the closed state and the connections 6, 7 extending to the pressure-operated device via the pipe 8 are connected to the main supply 2, the spindle ends having disengaged from one another.

Figure 2:
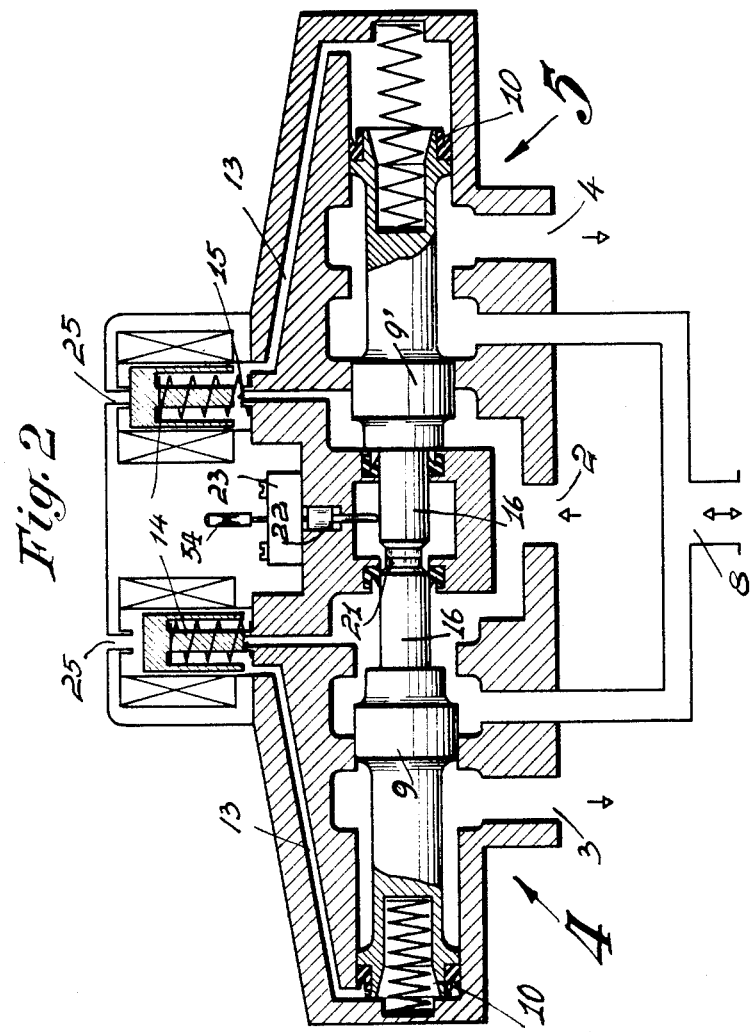
FIGURE 2 shows the same system as shown in FIGURE 1 but when a fault has occurred, for instance, because one of the auxiliary valves has failed.

If only one of the actuating valves 9, for instance only the left-hand valve 9 in the embodiment illustrated in FIGURE 2, is operated by actuation of the auxiliary valve 14 so that the corresponding chamber 12 is connected to an outlet 25 through the servo auxiliary pipe 13, the servo pressure operative on the cross-section of the right-hand control valve 9' can shift the same very much further to the left and into the position shown in FIGURE 2. The trip element 22 is therefore lifted out of the recess 21 so that the switch 23 is operated and cuts out the other auxiliary or servo valve 14. The actuating valves 9, 9' therefore return to the central position shown in FIGURE 1 and the whole apparatus—i.e., the pressure-operated device—is stopped. Such device cannot be cut in again since it is always disconnected from the supply of pressure medium when the system is reclosed without clearance of the first fault. The distance over which one actuating valve 9 follows the other in the event of incorrect operation can be determined by adjustable stops (not shown) disposed either in the working chambers 12 or in the supply chamber.

Instead of the end faces of the two spindles 16 bearing directly one against another, and instead of the trip element 22 being actuated directly, the system shown in the embodiment illustrated in FIGURE 3 can be used wherein the trip element 22 is operated indirectly, the ends of the actuating valves engaging with one another, for instance, only by way of a spring 26, while the springs 11 are still provided in the working chambers 12 but must be given more prestressing than in the other embodiments so that in the pressureless state for the two actuating valves are urged into their closed and central position and load the spring 26. In its central part the spring 26 carries a bush 27 which is either formed with a recess 21 engageable by the trip element 22 or comprises a cam (not shown). The member 27 is connected by way of a lever 29 mounted on a pivot 28 to the valve casing 1. The spring 26 is subdivided, and the facing ends of the component springs bear against the member 27. As compared with the embodiment illustrated in FIGURE 1, therefore, the trip element 22 is operated indirectly via the spring 26.

Instead of using two main control valves in the form of actuating slide valves on a common axis, as shown in FIGURE 1, two multiple-way main control valves, in the form of entry valves, can be provided as shown in the embodiment illustrated in FIGURE 3; operation is again through the agency of magnetically operated valves 14, with the use of actuating pistons 10 and a branched servo auxiliary circuit 13 as in FIGURE 1.

The closure members 30 of these three-way main control valves are in the form of double-entry closure members, and the valve spindle ends 16 engage with one another via the spring 26. In this embodiment the two main valves are so devised as to allow pressure medium to flow to the pressure-operated device by moving, with assistance from the spring 26, when the pressure operative on the actuating pistons 10 decreases. The servo valves 14 close only when servo medium pressure is operative at the supply; if required, the valves 14 can be influenced by springs 32 just as in the embodiment illustrated in FIGURE 1. Simultaneously, the pressure rises in the working chambers 12 and each of the closure members 30 moves into its respective closed position. Extra closing springs 11 can be provided to maintain the final closure position and must be strong enough to overcome the force of the spring 26.

Preferably, the spring 26 engages in recesses 31 in the valve spindle ends, and the valve spindles are disposed in the central zone of the spring 26 and, by way of the recess 21 or of a cam (not shown), operates the trip element 22 immediately when one of the valves—i.e., one of the closure members 30—does not operate simultaneously with the other. For instance, if the left-hand valves fails and only the right-hand valve—i.e., the right-hand closure member 30—is opened by the pressure decrease in the servo circuit 13, the stressing of the spring 26 decreases only at one end thereof and the bush 27 is moved to actuate the trip element 22.

The width of the recess 21 or of the alternative cam should be such that minor electrical and/or mechanical delays in the two main valves can be equalised. Another important factor is that the size of the recess 21 and its central operating point be adjustable, in order that there may be provision for adjusting not only the operating sensitivity of the trip element but also the sensitivity of operation in a particular direction. The trip element 22 can be reset to normal directly or indirectly by way of the element 54, as shown in FIGURE 1, with simultaneous resetting of the switch 23 and/or of the closure members (not shown) in the pressure medium supply pipe 2, to render the complete apparatus ready for operation again.

FIGURE 4 illustrates two parallel-operated double-entry valves; closure members 30 on valve spindles 33 control ports 34 for two exits 3 through which pressure is reduced in the two pipes 6, 7 branching from the pipe 8 extending to the pressure-operated device. In this embodiment, the valve spindles 33 are operated by the two actuating pistons 10 by increases and decreases of pressure in the working chambers 12. Such increases and decreases are controlled by a servo auxiliary circuit 13 which is branched off the main supply 2 and which, by way of one servo valve 14 each, provides communication between the supply 2 and the chambers 12. The two servo valves 14, in the form of three-way valves, are preferably operated electrically by magnets 24, the same being energised and de-energised together so that the valves 14 open or close the two pipes 13 to the working chambers 12 together or allow such pipes to be vented through the exits 25. Upon venting of the chambers 12 the actuating pistons 10 move into their central position under the urging of the two springs 11, the force of which can, if required, be adjustable.

At their free inward ends, the valve spindles 33 co-operate to form a common sealing zone and are each formed with a passage 37. Each passage 37 extends into a respective cross-bore 38, so that the main supply 2 can be connected to the two connections 6, 7 for the device 8 once the two valve spindle ends disengage from one another. The two spindle ends 36 therefore co-operate to form a closure member and can, if required, be arranged to overlap one another, something along the lines of a slide valve, instead of forming the seat-like engagement illustrated. The facing inward ends 36 of the valve spindles are of smaller cross-section than the bearing parts of the spindles at the gaskets 17, and because of this difference in cross-section the pressure of the fluid admitted through the supply passage 2 tends to move the closing members 30 apart. When the two chambers 12 are vented through the exits 25 of the valves 14, such pressure is sufficient to move the valve spindles oppositely and simultaneously. The valve spindle end faces 36 disengage from one another and the pressure from the main supply 2 can be operative upon the device 8 via the passages 37, 38.

This rhythmic opening cycle of the valve spindles, with simultaneous depressurisation of both the chambers 12, is repeated at every normal "on" operation, the closure members 30 closing the ports 34 for the exits 3. If one of the auxiliary valves is wrongly operated by hand—i.e., it is not operated simultaneously—or if only one of the auxiliary valves has a mechanical or electrical failure, pressure is operative on only one of the main valves in one of the working chambers 12, with the result that, depending upon whichever of the chambers 12 is under pressure, the valve linkage subjected to a one-sided pressure is immediately moved beyond its normal central position so far that the inner valve spindle ends 36 cannot disengage from one another to provide an opening movement and any pressure operative in the pipe 8 is reduced by venting to the exit 3 through the closure member 30 which is associated with the faulty valve and which has remained open. The safety requirements are therefore met.

This unidirectional but common additional displacement of the two valve spindles, which remain in engagement with one another, must be cancelled by clearance of the fault before the system can resume normal operation. The two inward valve spindle ends therefore remain in engagement with one another in any faulty operation so that no pressure can be transmitted through the passages 37, 38 to the pressure-operated device. Also, the springs 11 and the residual pressure in the chambers 12 ensure that, however great the accelerations may be, the valve spindle ends cannot disengage from one another.

Of course, instead of the two multiple-way valves which operate in opposite directions to one another and which are disposed on a common valve spindle axis taking the form of seat valves, the closure members 30 can take the form of piston-like slide valves, of the kind shown in FIGURE 1, in their sealing cross-sections controlling the two exits 3 and can be correspondingly sealed, so that the two multiple-way valves with their two valve spindles move satisfactorily to opposite hands for a normal opening, yet the follower action of the valve spindles in incorrect operation is ensured.

The inner facing ends 36 of the valve spindles have a smaller total cross-section than the gasket 17 for forming the difference pressure, and, as in previous embodiments, such total cross-section leads to a common recess 21 which serves to trip the extra safety device. In the embodiment illustrated in FIGURE 4, a trip element 22 engages in the recess 21 with some internal clearance therefrom, is guided in sealing-tight fashion axially in the casing 1, and is urged by a preferably adjustable restoring force. When the two valve spindles are actuated unidirectionally, the step up to the thicker part of the valve spindle moves the trip element 22 against the restoring force, and the element 22 can either open an electric switch 23 in manner known per se to cut off the electricity to the apparatus or can operate a closure member (not shown) in the main pressure medium supply 8. Resetting controls 54, which can be operated only by hand, restore the main valves to the normal central position once the fault has been cleared. The apparatus remains inoperative until reset by the controls 54.

The cross-section of the guide for the trip element 22 and the restoring force operative thereon can be so dimensioned that, if there is an excessive pressure rise in the main pressure medium supply 8, the trip element 22 is moved against the restoring force and stops the apparatus. A further safety feature is provided in this way.

There may be pressure losses or discrepancies in timing in the servo pipe 13 and in the operation of the two auxiliary valves 14, with the result that the two valve spindles 33 may shift prematurely to one or the other hand. To obviate any such unidirectionally varying displacement of the two valve spindles, adjustable throttle zones 65 are provided in the servo circuits 13 extending to the working chambers 12—i.e., between the chamber 12 and the servo valve 14—in order that the pressure increase in each of the two chambers 12 may be adapted to one another in time, for instance, either exactly or possibly with some deliberate offset.

The embodiment illustrated in FIGURE 5 is a further development of a system as shown in FIGURE 4, and a reset control 56 engages in each outward end 55 of the valve spindles. The trip or control elements 56 in this embodiment are so devised that the valve spindle ends are mounted in the casing 1, while the trip element is spring-loaded and, through the agency of a pawl 57, can latch behind the radial end face 58 of the valve spindles, as can be seen in the right-hand part of FIGURE 5. Alternatively, the pawls 57 can engage in recesses in the valve spindles. To reset the control 56, it must be raised against the resetting spring 59 once the fault has been cleared—i.e., the end of the valve spindle concerned must be advanced.

Since the system is in practice such that two three-way valves are provided in parallel with their valve spindles on a common axis and with both the exits to the load and the two supplies being combined, it is certain that, for instance, if one of the closure members 30 fails after performing a normal opening—i.e., if one of the closure elements 30 sticks, for instance, in the open position—the other closure member returns to the closed position and thus closes the two valve spindle ends. Also, the pressure-operated device can expand through the connection which remains open. A safety control system is therefore provided which, whatever the operating sequences may be, disconnects the load from the supply immediately faults or incorrect operations occur in any of the operating positions. If desired, to make sure that, in the event of wrong operation, the cross-bore 38 is in one of the off positions definitely isolated from the supply connections 6 or 7, the position of the passage 38 on the valve spindle end relatively to the passage 37 can be such that, in one or other end position, in the event of one-sided loading of one of the working chambers 12, the cross-passage 38 is disposed in the supply chamber 2 or stays in the sealed state within the sealing zone 17.

I claim:
1. In a valve control system, in combination:
   (a) valve casing means;
   (b) a supply conduit for supplying fluid under pressure;
   (c) a return conduit for releasing the pressure of said fluid;
   (d) two connecting conduits adapted to be connected to a fluid operated device to be controlled by the valve control system, said conduits communicating with said casing means;
   (e) two valve members having a common axis and being axially movable in said casing means between corresponding first position adjacent the other valve member, and corresponding second positions spaced from said first positions in a direction away from said other valve member,
      (1) said valve members when in one of said corresponding positions respectively defining flow paths in said casing selectively connecting said supply conduit with respective ones of said connecting conduits, and when in the other corresponding positions thereof respectively defining flow paths in said casing selectively connecting said return conduit with said respective connecting conduits;
   (f) displacing means for normally urging said valve members from said first to said second positions thereof;
   (g) an actuating piston secured to each valve member for joint movement, said actuating piston movably engaging said casing means and defining a chamber therewith;
   (h) auxiliary valve means associated with each of said chambers for admitting pressure fluid to the associated chamber and for venting the same, the admitted pressure fluid urging the associated valve member to move in a direction from said second toward said first position against the force of said displacing means; and
   (i) motion transmitting means axially interposed between said valve members for urging each valve member to move from said first toward said second position thereof when the other valve member is moved in a direction from the second toward the first position thereof.

2. In a system as set forth in claim 1, said piston being fastened to the corresponding valve member, and the associated chamber extending from said piston in an axial direction away from the other valve member.

3. In a system as set forth in claim 1, actuating means for selectively actuating each of said auxiliary valve means.

4. In a system as set forth in claim 3, said actuating means being electrically operated, switch means for operating said actuating means, and tripping means responsive to movement of one of said valve members under the urging of said motion transmitting means for tripping said switch means.

5. In a system as set forth in claim 1, a yieldably resilient member axially interposed between said valve members, said resilient member constituting said displacing means and said motion transmitting means.

6. In a system as set forth in claim 1, a yieldably resilient member in each of said chambers and engaging said actuating piston for urging the associated valve member to move in a direction from said second toward said first position thereof.

7. In a valve control system, in combination:
 (a) a valve casing;
 (b) supply conduit means for supplying fluid under pressure;
 (c) return conduit means for releasing the pressure of said fluid;
 (d) two connecting conduits adapted to be connected to a fluid operated device to be controlled by the valve control system, said conduit means and said connecting conduits communicating with said casing;
 (e) two valve members having a common axis and being axially movable in said casing in a direction toward each other and in a direction away from each other relative to a central position in which said valve members define flow paths between one of said conduit means and respective ones of said connecting conduits,
  (1) said valve members when in respective first positions spaced from said central position in one of said directions defining flow paths between the other conduit means and said respective connecting conduits, and
  (2) said valve members when in respective second positions spaced from said central position in the other one of said direction defining flow paths between said return conduit and said respective connecting conduits;
 (f) yieldable means for normally urging said valve members to move away from each other;
 (g) an actuating piston mounted on each valve member for joint movement therewith, said piston movably engaging said casing and defining a chamber therein;
 (h) an auxiliary valve associated with each chamber for admitting pressure fluid thereto and for venting the same, the admitted pressure fluid urging the associated valve member to move from said central position in a direction toward the other valve member against the force of said displacing means; and
 (i) motion transmitting means axially interposed between said valve members for urging each valve member to move from said central position in a direction away from the other member when the other valve member is moved by the pressure fluid admitted to the associated chamber from said central position thereof.

8. In a system as set forth in claim 7, said valve members having respective face portions abuttingly engaging each other, when said valve members are in said central positions thereof, said face portions constituting said motion transmitting means.

9. In a system as set forth in claim 8, said valve members when in said central position defining flow paths connecting said return conduit means with said respective connecting conduits, and said first positions of said valve members being spaced from said central positions in a direction away from the other valve member.

10. In a system as set forth in claim 7, said connecting conduits communicating with each other.

11. In a valve control system, in combination:
 (a) a valve casing;
 (b) supply conduit means for supplying fluid under pressure;
 (c) return conduit means for releasing the pressure of said fluid;
 (d) two connecting conduits adapted to be connected to a fluid operated device to be controlled by the valve system, said conduit means and said conduits communicating with said casing;
 (e) two valve members having a common axis and being axially movable in said casing toward and away from each other, and toward and away from a central position in which said valve members define flow paths between said return conduit means and respective ones of said connecting conduits,
  (1) said valve members when in respective positions spaced from said central position and from each other defining flow paths between said supply conduit means and said respective connecting conduits;
 (f) pressure means for urging said valve members to move away from each other;
 (g) an actuating piston mounted on each valve member for joint movement therewith, said piston movably engaging said casing and defining a chamber therein;
 (h) an auxiliary valve associated with each chamber for admitting pressure fluid thereto and for venting the same, the admitted pressure fluid urging the associated valve member to move in a direction toward the other valve member against the force of said pressure means; and
 (i) motion transmitting means axially interposed between said valve members for urging each valve member to move from said central position in a direction away from the other member when the other valve member is moved by the pressure fluid admitted to the associated chamber from said central position thereof.

12. In a system as set forth in claim 11, each of said valve members having a face portion, the face portions of said valve members abuttingly engaging each other when said valve members are in said central position thereof, and constituting said motion transmitting means.

13. In a system as set forth in claim 12, two gasket means in said casing, each valve member being sealingly movable in respective gasket means, said gasket means dividing said casing into three portions, one of said portions communicating with said supply conduit means, said face portions of said valve members moving toward and away from each other in said one casing portion when the valve members move relative to each other, each face portion being formed with an opening in said one casing portion and communicating with the respective connecting conduit, and sealingly engaging the other face portion when said face portions abuttingly engage each other.

14. In a system as set forth in claim 13, each of the other portions of said casing having a port communicating with said return conduit means, said valve member sealingly engaging said port when moving away from said central position in a direction away from the other valve member.

References Cited in the file of this patent
UNITED STATES PATENTS

| | | |
|---|---|---|
| 2,636,581 | Bitler | Apr. 28, 1953 |
| 2,906,246 | DiTirro | Sept. 29, 1959 |
| 2,986,121 | Nowack | May 30, 1961 |
| 2,998,026 | Becker | Aug. 29, 1961 |
| 3,059,621 | Ruchser | Oct. 23, 1962 |